United States Patent Office 2,851,508
Patented Sept. 9, 1958

2,851,508

NATURAL RUBBER VULCANIZING COMPOSITION CONTAINING SULFONATE ESTERS AS SCORCH RETARDERS AND METHOD OF VULCANIZING SAME

Carl A. Uraneck, Phillips, Tex., assignor to Phillips Petroleum Company, a corporation of Delaware No Drawing. Application July 14, 1953
Serial No. 367,970

15 Claims. (Cl. 260—780)

This invention relates to the use of sulfonate esters as scorch retarders in the vulcanization of rubber compounds. It relates also to new rubber compounds which result from the use of these specific derivatives.

Vulcanization accelerators are employed in the manufacture of rubber products to speed up the curing or vulcanization of the rubber product. When natural rubber is vulcanized in the presence of conventional accelerators and particularly with furnace carbon blacks of relatively high pH value, the composition frequently has a tendency to prevulcanize. This precuring or prevulcanization is known in the art as "scorching," and it is essential that this be prevented in order to permit proper factory processing, such as preforming or shaping the desired article prior to the actual vulcanization. When natural rubber is compounded in a conventional recipe using conventional accelerators and a relatively low pH carbon black, such as a channel black, this carbon black retards the curing action, and scorching is not a particularly serious problem. However, with carbon blacks having a pH above 8 it is usually necessary to employ a scorch retarder in the compounding mixture.

According to our invention, there is provided a method of preventing scorch in the compounding of rubbers, especially natural rubbers, by incorporating into the recipe or mix a compound now to be described.

The scorch retarders of my invention are sulfonate esters of the following formula

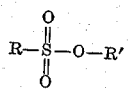

wherein R is selected from the group consisting of an alkyl, cycloalkyl, aryl radical and any combination of these radicals and will contain from 6 to 20 carbon atoms and R' is selected from the group consisting of an alkyl, cycloalkyl, and a combination of these radicals and will contain not more than 16 or less, preferably 4 or less, carbon atoms. These groups can also contain oxygen in the form of ether linkages and can contain substituents, such as hydroxy groups and the like, provided they do not have any adverse effect on the scorch retarding properties of the molecule. Methods for the preparation of such compounds are disclosed in the prior art.

Examples of suitable derivatives which are useful as scorch retarders include methyl naphthalenesulfonate, ethyl xylenesulfonate, isopropyl hexadecanesulfonate, tertiary-butyl 2-phenylhexanesulfonate, secondary-butyl p-ethoxybenzenesulfonate, cyclohexyl diisopropylbenzenesulfonate, 3-methylcyclohexyl p-tertiary-butylbenzenesulfonate, tertiary-hexadecyl toluenesulfonate, cyclopentyl octanesulfonate, 8-hydroxy-n-decyl methylcyclohexanesulfonate, tertiaryoctyl 4-cyclohexylbutanesulfonate, n-butyl 4-methoxydodecanesulfonate, 3-cyclohexylpropyl 2-tertiary-butylnaphthalenesulfonate and the like.

The quantity of the novel scorch retarder employed will depend to some extent on the molecular weight of the specific compound, and in general the higher the molecular weight the greater is the quantity required to provide a given retardation. We have found that from 0.5 to 5 parts per hundred of rubber can be used and usually we prefer to employ from 1.0 to 3 parts per hundred of rubber. If desired, in excess of about 5 parts per hundred of rubber of the novel scorch retarders can be employed.

My materials are effective in compounding recipes employing the vulcanization accelerators such as xanthates, dithiocarbamates, mercaptobenzothiazole, benzothiazole disulfide, N-cyclohexyl-2-benzothiazole sulfenamide, and the like.

The scorching property of a particular rubber mix can be determined by various test methods which are described in the literature. I have employed one of the common methods, known as the Mooney scorch determination to obtain the results which are shown in the following example. In this method the samples are placed in a Mooney shearing disc viscometer and the resistance of the rubber to a shearing action at a given temperature is determined. This method is described in U. S. 2,582,829 (1952) by Harbison as well as in technical articles.

While my scorch retarders are most useful in compounding natural rubber with a high pH furnace black, they also have a certain utility and provide a measure of retardation of scorching in compounding synthetic rubber. They will also be found to have some utility in recipes in which low pH carbon blacks, such as channel blacks, are employed.

EXAMPLE

Three rubber mixes were prepared according to the following compounding recipe. One of these contained no scorch retarder and served as a control while the other two contained methyl p-toluenesulfonate and ethyl p-toluenesulfonate respectively.

*Table I*

|  | Parts by Weight | | |
|---|---|---|---|
| #1 Smoked Sheet | 100 | 100 | 100 |
| Philblack O [1] | 50 | 50 | 50 |
| Zinc Oxide | 4 | 4 | 4 |
| Stearic Acid | 3 | 3 | 3 |
| Paraflux [2] | 3 | 3 | 3 |
| Flexamine [3] | 1 | 1 | 1 |
| Santocure [4] | 0.4 | 0.4 | 0.4 |
| Sulfur | 2.0 | 2.0 | 2.0 |
| Methyl p-toluenesulfonate |  | 1.0 |  |
| Ethyl p-toluenesulfonate |  |  | 1.0 |

[1] High pH furnace carbon black.
[2] An asphaltic flux.
[3] Physical mixture containing 65 wt. percent of a complex diarylamine-ketone reaction product and 35 wt. percent N,N'-diphenyl-p-phenylenediamine.
[4] N-cyclohexyl-2-benzothiazole sulfenamide.

The Mooney scorch time at 250° F. and other physical properties of the above samples were determined and are recorded in the following table:

Table II

[30 minutes' cure time at 307° F.]

| Scorch Retarder | 80° F. | | | Oven Aged 24 Hrs, @ 212° F. | | | | Scorch at 250° F. | |
|---|---|---|---|---|---|---|---|---|---|
| | 300% Modulus, p.s.i. | Tensile, p.s.i. | Elongation, percent | 300% Modulus, p.s.i. | Tensile, p.s.i. | Elongation, percent | Compression Set, percent | Minimum Mooney | Minutes to Scorch |
| None | 1,690 | 3,250 | 490 | 1,740 | 2,125 | 340 | 19.0 | 44.5 | 15 |
| Methyl p-toluenesulfonate | 1,440 | 2,950 | 485 | 1,465 | 1,540 | 310 | 28.0 | 38 | 19.5 |
| Ethyl p-toluenesulfonate | 1,590 | 3,100 | 480 | 1,500 | 1,725 | 340 | 23.7 | 36.5 | 18 |

The use of the sulfonate esters increased the scorch time at 250° F. by 4½ and 3 minutes respectively as indicated in the preceding table. This is an increase of 30 and 20 percent over the scorch time of the control, which contained no scorch retarder.

Reasonable variation and modification are possible within the scope of the foregoing disclosure and the appended claims to the invention, the essence of which is that a method for increasing scorch time, i. e., reducing or avoiding precuring during the compounding of rubbers, especially natural rubber, has been provided together with rubber compositions, containing a scorch retarder according to the invention, which compositions exhibit increased scorch times, said scorch retarder being a sulfonate ester, preferably a sulfonate ester as set forth and described herein.

I claim:
1. A method for increasing the scorch time of a natural rubber composition comprising a vulcanization accelerator which comprises incorporating into said composition an effective amount of a scorch retarder selected from the group consisting of compounds having the following formula:

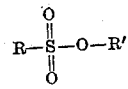

wherein R is selected from the group consisting of an alkyl, cycloalkyl, aryl radical and radicals composed of any combination of these radicals and will contain from 6 to 20 carbon atoms and R' is selected from the group consisting of an alkyl, cycloalkyl, and radicals composed of a combination of these radicals and will contain not more than 16 carbon atoms.

2. A method according to claim 1 wherein 0.5 to 5 parts per hundred of rubber of the said ester is incorporated into said composition.

3. A method of increasing the scorch time of a natural rubber composition comprising a vulcanization accelerator which comprises incorporating into said composition an effective amount of an alkyl aromatic sulfonate in which the aromatic portion of the molecule contains 6–20 carbon atoms and in which the alkyl portion of the molecule does not contain more than 16 carbon atoms.

4. A method of increasing the scorch time of a natural rubber composition comprising a vulcanization accelerator which comprises incorporating into said composition an effective amount of methyl p-toluenesulfonate.

5. A method of increasing the scorch time of a natural rubber composition comprising a vulcanization accelerator which comprises incorporating into said composition an effective amount of ethyl p-toluenesulfonate.

6. A rubber composition having improved scorch time characteristics, said composition containing essentially a natural rubber, a vulcanization accelerator, and an effective amount of an alkyl aromatic sulfonate in which the aromatic portion of the molecule contains 6–20 carbon atoms and in which the alkyl portion of the molecule does not contain more than 16 carbon atoms.

7. A rubber composition having improved scorch time characteristics, said composition containing essentially a natural rubber, a vulcanization accelerator, and an effective amount of a sulfonate ester having the following formula:

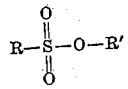

wherein R is selected from the group consisting of an alkyl, cycloalkyl, aryl radical and radicals composed of any combination of these radicals and will contain from 6 to 20 carbon atoms and R' is selected from the group consisting of an alkyl, cycloalkyl, and radicals composed of a combination of these radicals and will contain not more than 16 carbon atoms.

8. A rubber composition having improved scorch time characteristics, said composition containing essentially a natural rubber, a vulcanization accelerator, and an effective amount of a methyl p-toluenesulfonate.

9. A rubber composition having improved scorch time characteristics, said composition containing essentially a natural rubber, a vulcanization accelerator, and an effective amount of an ethyl p-toluenesulfonate.

10. A method of increasing the scorch time of a rubber composition comprising a vulcanization accelerator which comprises incorporating into said composition a methyl naphthalenesulfonate.

11. A method of increasing the scorch time of a rubber composition comprising a vulcanization accelerator which comprises incorporating into said composition an ethyl xylenesulfonate.

12. A method of increasing the scorch time of a rubber composition comprising a vulcanization accelerator which comprises incorporating into said composition a secondary-butyl p-ethoxybenzenesulfonate.

13. A rubber composition having improved scorch time characteristics, said composition, containing essentially a natural rubber, a vulcanization accelerator, and a methyl naphthalenesulfonate.

14. A rubber composition having improved scorch time characteristics, said composition containing essentially a natural rubber, a vulcanization accelerator, and an ethyl xylenesulfonate.

15. A rubber composition having improved scorch time characteristics, said composition containing essentially a natural rubber, a vulcanization accelerator, and a secondary-butyl p-ethoxybenzenesulfonate.

References Cited in the file of this patent

UNITED STATES PATENTS

| 1,871,037 | Cadwell | Aug. 9, 1932 |
| 2,687,444 | Crouch et al. | Aug. 24, 1954 |